US012227653B2

(12) United States Patent
Untiedt et al.

(10) Patent No.: US 12,227,653 B2
(45) Date of Patent: Feb. 18, 2025

(54) FLUORINATED COUMARINS

(71) Applicant: 3M INNOVATIVE PROPERTIES COMPANY, St. Paul, MN (US)

(72) Inventors: Nicholas L. Untiedt, Minneapolis, MN (US); Paul B. Armstrong, St. Paul, MN (US); Patricia M. Savu, Maplewood, MN (US); Phillip E. Tuma, Faribault, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 128 days.

(21) Appl. No.: 17/767,468

(22) PCT Filed: Dec. 10, 2020

(86) PCT No.: PCT/IB2020/061758
§ 371 (c)(1),
(2) Date: Apr. 8, 2022

(87) PCT Pub. No.: WO2021/124032
PCT Pub. Date: Jun. 24, 2021

(65) Prior Publication Data
US 2024/0117191 A1 Apr. 11, 2024

Related U.S. Application Data

(60) Provisional application No. 62/950,172, filed on Dec. 19, 2019.

(51) Int. Cl.
*C09B 57/02* (2006.01)
*C09B 69/10* (2006.01)
*G01M 3/20* (2006.01)

(52) U.S. Cl.
CPC ............ *C09B 57/02* (2013.01); *C09B 69/109* (2013.01); *G01M 3/20* (2013.01)

(58) Field of Classification Search
CPC ......... C09B 57/02; C09B 69/109; G01M 3/20
See application file for complete search history.

(56) References Cited

U.S. PATENT DOCUMENTS

| | | | |
|---|---|---|---|
| 4,758,366 A | 7/1988 | Parekh | |
| 4,909,806 A | 3/1990 | Garbe | |
| 5,149,453 A | 9/1992 | Parekh | |
| 5,357,782 A | 10/1994 | Henry | |
| 6,132,636 A * | 10/2000 | Singh | G01M 3/228 73/40.7 |
| 6,165,384 A | 12/2000 | Cooper | |
| 6,894,105 B2 | 5/2005 | Parent | |
| 6,930,184 B2 | 8/2005 | Olson | |
| 7,264,745 B2 | 9/2007 | Nappa | |
| 7,501,074 B2 | 3/2009 | Minor | |
| 7,585,594 B2 | 9/2009 | Palanisamy | |
| 8,350,035 B2 | 1/2013 | Koenemann | |
| 8,674,104 B2 | 3/2014 | Koenemann | |
| 9,644,168 B2 | 5/2017 | Matsumoto | |
| 9,828,567 B2 | 11/2017 | Matsumoto | |
| 2004/0203159 A1 | 10/2004 | Zander | |
| 2005/0039274 A1 | 2/2005 | Yang | |
| 2005/0145822 A1* | 7/2005 | Drigotas | C10M 171/008 252/68 |
| 2006/0049329 A1 | 3/2006 | Duerr | |
| 2006/0266976 A1 | 11/2006 | Minor | |
| 2006/0281924 A1 | 12/2006 | Yang | |
| 2009/0056349 A1 | 3/2009 | Nappa | |
| 2010/0171108 A1 | 7/2010 | Koenemann | |
| 2013/0193327 A1 | 8/2013 | Berton | |
| 2016/0266002 A1 | 9/2016 | Hunt | |

FOREIGN PATENT DOCUMENTS

| | | | |
|---|---|---|---|
| CN | 103497541 A * | 1/2014 | ............ C09B 67/22 |
| CN | 103497541 | 8/2015 | |
| JP | H04-128280 | 4/1992 | |
| JP | H04128280 A * | 4/1992 | ........... C07D 311/08 |
| JP | 2009143821 | 7/2009 | |
| KR | 101278118 | 6/2013 | |
| WO | wo 2019-220293 | 11/2019 | |

OTHER PUBLICATIONS

Buck, "Perfluoroalkyl and Polyfluoroalkyl Substances in the Environment: Terminology, Classification, and Origins", Society of Environmental Toxicology and Chemistry, Integrated Environmental Assessment and Management, 2011, vol. 07, No. 04, pp. 513-541.
Kalkhambkar, "Synthesis and Biological Activities of Some New Fluorinated Coumarins and 1-Aza Coumarins", European Journal of Medicinal Chemistry, 2008, vol. 43, pp. 2178-2188.
Kirrane, "7-Amino-4-Perfluoroheptylcoumarins: a Novel Class of Perfluorocarbon-Soluble Fluorescent Dyes", Journal of Fluorine Chemistry, 1993, vol. 62, pp. 289-292.
Matsui, "Functionality of Fluorine-Containing Dyes", Journal of Fluorine Chemistry, 1999, vol. 96, pp. 65-69.
Matsui, "Reaction of Bis(Perfluoralkanoyl)Peroxide With Dyes", Journal of Fluorine Chemistry, 1992, vol. 58, A46, p. 173.
Schnitzler, "Synthesis and Characterization of Pentafluorophenyl-Substituted Perylenebis(dicarboximides)", Helvetica Chimica Acta, 2009, vol. 92, pp. 2525-2531.
Yagupolskii, "Synthesis of the First Representative of Dicarbothiacyanine Dyes With Completely Fluorinated Polymethine Chain", Journal of Fluorine Chemistry, 2010, vol. 131, pp. 165-171.

(Continued)

*Primary Examiner* — Bijan Ahvazi
(74) *Attorney, Agent, or Firm* — Julie Lapos-Kuchar

(57) ABSTRACT

Described herein is fluorinated dye comprising: a fluorescing coumarin-derived moiety connected to an oligomer of hexafluoropropylene oxide via a non-fluorinated divalent linking group. Such fluorinated dyes are soluble in fluorinated fluids and may be used to detect leaks in various systems such as refrigerant, air conditioning and/or heat transfer systems.

12 Claims, No Drawings

(56) References Cited

OTHER PUBLICATIONS

Yuan, "Core-Perfluoroalkylated Perylene Diimides and Naphthalene Diimides: Versatile Synthesis, Solubility, Electrochemistry, and Optical Properties", The Journal of Organic Chemistry, 2010, vol. 75, pp. 3007-3016.

International Search Report for PCT International Application No. PCT/IB2020/061758, mailed on Apr. 8, 2021, 4 pages.

* cited by examiner

FLUORINATED COUMARINS

TECHNICAL FIELD

Disclosed herein are fluorinated coumarin dyes, which are soluble in fluorinated fluids. Such dyes can be used for leak detection.

SUMMARY

There is a desire to identify compounds that are soluble in fluorinated liquids, which do not absorb in the visible spectrum, but fluoresce when exposed to ultra-violet radiation.

In one aspect, a fluorinated dye is disclosed, the fluorinated dye comprising: a fluorescing coumarin-derived moiety connected to an oligomer of hexafluoropropylene oxide via a non-fluorinated divalent linking group.

In another aspect, a testing solution is described. The testing solution comprising (i) a fluorinated dye comprising a fluorescing coumarin-derived moiety connected to an oligomer of hexafluoropropylene oxide via a non-fluorinated divalent linking group; and (ii) a fluorinated fluid.

In yet another aspect, a method for detecting leaks is described. The method comprising (a) introducing a fluorinated dye comprising a fluorescing coumarin-derived moiety connected to an oligomer of hexafluoropropylene oxide via a non-fluorinated divalent linking group within a refrigeration system comprising a refrigerant composition comprising a fluorinated fluid, (b) operating the refrigeration system for a sufficient time to allow for thorough mixing of the fluorinated dye and the refrigerant composition; and (c) determining the presence of a leak in the refrigeration system by directing an ultraviolet light at the refrigeration system and subsequently detecting a fluorescing color.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B); and
"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, nitrogen atoms, sulfur atoms, chlorine atoms, bromine atoms, and iodine atoms.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

Colorants are well known as leak detection agents within refrigeration and air conditioning systems. Such systems may contain a refrigerant and lubricants. The lubricants are present in order to prevent wear to the internal parts of such a refrigeration or air conditioning system. The colorants are generally soluble in the lubricant, which includes non-fluorinated compounds, for example, naphthenic oils, paraffinic oils, alkylbenzenes, polyalkylene glycols (particularly polypropylene glycol), silicones, di- and tri-esters of di- and tri-carboxylic acids, polyalkyl silicate oils, and polyol esters or other classes of lubricants necessarily added to refrigerants and refrigerant azeotropes. If a leak exists within the pertinent system, a portion of the lubricant, including the solubilized colorant, would also transport out of the system. Generally, the refrigerant is a fluorinated fluid. In some applications, no lubricants are used with the fluorinated fluid and in fact, lengths are taken to ensure even the fluorinated fluid is substantially free of impurities. Thus, there is need for a colorant, which is soluble in fluorinated fluids, which can be used in systems such as refrigeration and air conditioning systems.

The present disclosure is directed toward a coumarin-based dye, which is soluble in a range of fluorinated fluids.

The coumarin-based dye of the present disclosure is a fluorinated molecule comprising a fluorescing coumarin-derived moiety connected to an oligomer of hexafluoropropylene oxide via a non-fluorinated divalent linking group.

The coumarin-derived moiety refers to any at least monovalent moieties having the structure

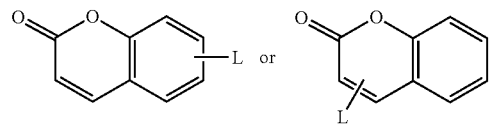

Where L a linking group used to attach the coumarin-derived moiety to the fluorinated portion of the molecule. As shown above, the linking group can be attached to any ring carbon atom. Also, contemplated, but not shown above, is that either of the rings of the moiety may be substituted, again off of one of the ring carbon atoms, with at least one group such as an alkyl group comprising at least 1, 2, 4, 5, 6 or even 8 carbon atoms and at most 10, 12, 14, 16, 18 or even to 20 carbon atoms; an alkoxy group comprising at least 1, 2, 4, 5, 6 or even 8 carbon atoms and at most 10, 12, 14, 16, 18 or even to 20 carbon atoms; and amino groups such as amino functional coumarins. The coumarin portion of the molecule of the present disclosure imparts the fluorescing capability to the dye molecule. Thus, the linkage and any optional substitutions off the coumarin moiety should not impact the fluorescing capability of the molecule.

The oligomer of hexafluoropropylene oxide (HFPO), refers to repeat units derived from HFPO connected together via ring opening oligomerization. Exemplary divalent oligomers of HFPO include —(O—CF$_2$CF(CF$_3$))$_n$—, where n is an integer of at least 2, 3, 4, 5, 6, or even 8. The more HFPO derived repeat units, the more fluorine present and the more compatible the dye molecule will be in the fluorinated (including perfluorinated) fluids. However, n should not be so large, that it would detrimentally impact the compounds solubility. In one embodiment n is no more than 10, 12, 18, or even 20.

The HFPO oligomer is connected to the fluorescing coumarin-derived moiety via a non-fluorinated divalent linking group. Exemplary linking groups comprise an amide; an ester; an ether; or combinations thereof The linking groups may also comprise an alkylene unit such as —(CH$_2$)$_m$— where m is at least 2, 3, 4, or even 6; and no more than 8, 10, 12, 16, 18, or even 20.

In one embodiment, the fluorinated dye molecule of the present disclosure is according to formula (I)

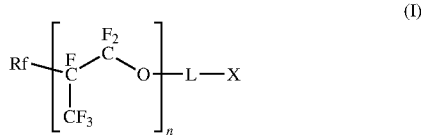

Where Rf is a perfluorinated alkyl or perfluorinated alkoxy group; n is an integer of at least 1; and L is a linking group comprising at least one of an amide, an ester, and an ether; and X is a monovalent fluorescing coumarin derived moiety.

Rf is a perfluorinated alkyl or perfluorinated alkoxy group comprising 1 to 5 carbon atoms. In one embodiment, Rf is CF$_3$CF$_2$CF$_2$O—, which is the end group that can result during the oligomerization of HFPO.

In one embodiment, n is an integer of at least 2, 3, 4, 5, 6, or even 8; and no more than 10, 12, 18, or even 20.

In one embodiment, L is —CF$_2$CF(CF$_3$)C(=O)NH—(CH$_2$)$_p$—O—, wherein p is an integer from 2 to 20.

Exemplary fluorinated dye molecules include:

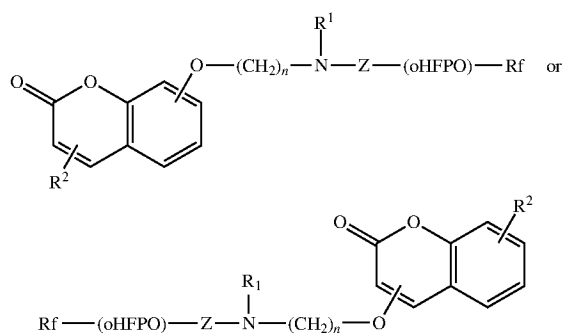

Where R$^2$ is H, methyl, ethyl, methoxy, or ethoxy; as described above, n is an integer from 2 to 20, R$^1$ is H or methyl; Z is —C(=O)— or —S(=O)$_2$—; (oHFPO) is the divalent HFPO oligomer; and Rf is perfluorinated alkyl or perfluorinated alkoxy group.

The fluorinated dye molecules disclosed herein may be synthesized via synthesis of a sulfonate functionalized HFPO oligomer and subsequent nucleophilic displacement of the sulfonate group with the corresponding coumarin dye molecule.

The fluorinated dye molecules of the present disclosure fluorescence, meaning that the molecules emit visible electromagnetic radiation when exposed to incident radiation of a shorter wavelength, such as ultraviolet radiation. For example, the fluorinated dye molecules of the present disclosure absorb ultraviolet wavelengths of electromagnetic radiation within the range of 250-400 nm, 250-350 nm, or even from 300-350 nm. In one embodiment, the fluorinated dye molecules of the present disclosure emit in the blue spectrum from about 350-470 nm.

In one embodiment, the fluorinated dye molecules of the present disclosure do not sufficiently absorb visible wavelengths of electromagnetic radiation within the range of 400-800 nm, meaning that when the fluorinated dye molecule is dissolved in a solution it does not impart any noticeable color as seen by the unaided human eye.

Typically, the fluorinated dye molecules of the present disclosure are highly viscous liquids at ambient temperature and pressure. By the term ambient, it is meant from between 20° and 30° C. and from about 0.75 to about 1.25 atmospheres. In actuality, the fluorinated dye molecules of the present disclosure will remain in a liquid state at all times, even upon introduction into for example, a refrigeration or air conditioning system. Upon such an introduction, the fluorinated dye molecules of the present disclosure immediately solubilizes within the fluorinated fluid within the system. A minimum amount of agitation and time is required for the fluorinated dye molecules of the present disclosure to dissolve within the fluorinated fluid.

Advantageously, the fluorinated dye molecules disclosed herein are soluble in fluorinated fluids, such as those fluid used in refrigerant, air conditioning, and/or heat transfer systems.

Typically, the fluorinated fluids are non-flammable based on closed-cup flashpoint testing following ASTM D-3278-96 e-1 "Standard Test Method for Flash Point of Liquids by Small Scale Closed-Cup Apparatus".

The fluorinated fluids industry is moving toward fluids, which are more environmentally friendly. For example, fluorinated fluids having a global warming potential (GWP) of less than 1000, 700, or even 500. As used herein, GWP is a relative measure of the global warming potential of a compound based on the structure of the compound. The GWP of a compound, as defined by the Intergovernmental Panel on Climate Change (IPCC) in 1990 and updated in 2007, is calculated as the warming due to the release of 1 kilogram of a compound relative to the warming due to the release of 1 kilogram of CO$_2$ over a specified integration time horizon (ITH).

$$GWP_i(t') = \frac{\int_0^{ITH} a_i[C(t)]dt}{\int_0^{ITH} a_{CO_2}[C_{CO_2}(t)]dt} = \frac{\int_0^{ITH} a_i C_{oi} e^{-t/\tau_i} dt}{\int_0^{ITH} a_{CO_2}[C_{CO_2}(t)]dt}$$

In this equation $a_i$ is the radiative forcing per unit mass increase of a compound in the atmosphere (the change in the flux of radiation through the atmosphere due to the IR absorbance of that compound), C is the atmospheric concentration of a compound, $\tau$ is the atmospheric lifetime of a compound, t is time, and i is the compound of interest. The commonly accepted ITH is 100 years representing a compromise between short-term effects (20 years) and longer-term effects (500 years or longer). The concentration of an organic compound, i, in the atmosphere is assumed to follow pseudo first order kinetics (i.e., exponential decay). The concentration of CO$_2$ over that same time interval incorporates a more complex model for the exchange and removal of $CO_2$ from the atmosphere (the Bern carbon cycle model).

In another example, the fluorinated fluids have an atmospheric lifetime of less than 10 years, or even less than 5 years when tested following the Atmospheric Lifetime Test Method as disclosed in U.S. Pat. Appl. No. 62/671,500 filed May 15, 2018.

In yet another example, the fluorinated fluids are non-bioaccumulative in animal tissue, having a low log $K_{ow}$ values, indicating a reduced tendency to bioaccumulate in animal tissues, where $K_{ow}$ is the octanol/water partition coefficient, which is defined as the ratio of the given compound's concentration in a two-phase system comprising an octanol phase and an aqueous phase. In one embodiment, the log $K_{ow}$ value is less than 7, 6, 5, or even 4.

The fluorinated fluid of the present invention comprises a nonionic, fluorinated molecule that may be linear, branched, or cyclic, and optionally may contain one or more additional catenary heteroatoms, such as nitrogen or oxygen. The solvent may be selected from the group consisting of fully (per)- and partially-fluorinated alkanes, amines, and ethers. Preferably, the fluorinated liquid is partially fluorinated and is non-functional, i.e. lacking functional groups that are polymerizable, reactive toward acids, bases, oxidizing agents, reducing agents or nucleophiles.

Fluorinated fluids used in refrigerant, air conditioning, and/or heat transfer systems include, for example, perfluorocarbons (PFCs), perfluoropolyethers (PFPEs), hydrochlorofluorocarbons (HCFCs), hydrofluorocarbons (HFCs), hydrofluoroethers (HFEs), and hydrohalofluoroethers (HHFEs).

PFCs include organic compounds in which all (or essentially all) of the hydrogen atoms are replaced with fluorine atoms. Such compounds are known to be inert and exhibit high thermal and chemical stability. Representative perfluorocarbons include cyclic and non-cyclic perfluoroalkanes, perfluoroamines, perfluoroethers, perfluoroamines, perfluorocycloamines, perfluorosulfones, perfluoroketones, perfluoroolefins, and any mixtures thereof. Specific representative perfluorocarbons include the following: perfluoropentane, perfluorohexane, perfluoroheptane, perfluorooctane, perfluorononane, perfluorodecane, perfluoromethylcyclohexane, perfluorotributyl amine, perfluorotriethyl amine, perfluorotripropyl amine, perfluorotriamyl amine, perfluoro-N-methylmorpholine, perfluoro-N-ethylmorpholine, perfluoroisopropyl morpholine, perfluoro-N-methyl pyrrolidine, perfluoro-1,2-bis(trifluoromethyl) hexafluorocyclobutane, perfluoro-2-ethyltetrahydrofuran, perfluoro-2-butyltetrahydrofuran, perfluorotriethylamine, perfluorodibutyl ether, and mixtures of these and other perfluorinated liquids.

Commercially available PFCs include those available under the trade designation "3M FLUORINERT ELECTRONIC FLUID" such as FC-40, FC-43, FC-72, FC-77, FC-84, FC-87, FC-3255, FC-3283, FC-3284 and FC-6003 from 3M Co., Maplewood, MN; and "3M PERFORMANCE FLUIDS" PF-5060, PF-5070, PF-5052 from 3M Co. Other commercially available perfluorinated liquids that are considered useful in the present invention include perfluorinated liquids sold under the trade designation "GALDEN LS" fluids available from Solvay S.A., Brussels, Belgium; those fluids sold under the trade designation "KRYTOX" and "VERTREL" fluids available from The Chemours Co., Wilmington, DE; and those fluid sold under the trade designation "FLUTEC PP" available from F2 Chemicals Ltd, Lancashire, United Kingdom.

PFPEs (perfluoropolyethers) are derived by the polymerization of perfluoropropylene oxide followed by stabilization, for example with fluorinated agents available under the trade designation "KRYTOX K" fluorinated oil from Chemours, Wilmington, DE. Fluids derived from tetraflouroethylene and HFPO are available under the trade designation "GALDEN HT" fluids from Solvay S.A.

Partially fluorinated liquids suitable for use typically contain from 3 to 20 carbon atoms and may optionally contain one or more catenary heteroatoms, such as divalent oxygen or trivalent nitrogen atoms. Useful partially fluorinated liquids include cyclic and non-cyclic fluorinated alkanes, amines, ethers, and any mixture or mixtures thereof. Preferably, the number of fluorine atoms exceeds the number of hydrogen atoms and more preferably the number of fluorine atoms is equal to or exceeds the sum of the number of hydrogen atoms and carbon-carbon bonds. Although not preferred, due to environmental concerns, the partially fluorinated liquids optionally may contain one or more chlorine atoms provided that where such chlorine atoms are present there are at least two hydrogen atoms on the geminal or adjacent carbon atom(s).

HCFC are compounds containing a carbon backbone substituted with carbon-bound fluorine, chlorine, and hydrogen atoms. Exemplary HCFCs include $CF_3CHCl_2$, $CH_3CCl_2F$, $CF_3CF_2CHCl_2$ and $CClF_2CHClF$.

Useful HFCs include organic compounds having a 3-to 8-carbon saturated backbone substituted with both hydrogen and fluorine atoms, but essentially no other atoms, such as chlorine. HFCs having a 4-to 8-carbon backbone are preferred. The carbon backbone can be straight, branched, cyclic, or mixtures of these. Useful HFCs include compounds having more than approximately 5 molar percent fluorine substitution, or less than 95 molar percent fluorine substitution, based on the total number of hydrogen and fluorine atoms bonded to carbon, and specifically excludes PFCs, PFOs, PFPEs,CFCs, HCFCs, and HHFEs. Exemplary HFCs include $CF_3CFHCFHCF_2CF_3$, $C_5F_{11}H$, $C_6F_{13}H$, $CF_3CH_2CF_2H$, $CF_3CF_2CH_2CH_2F$, $CHF_2CF_2CF_2CHF_2$, $CF_2HCF_2CH_2F$, $CH_2FCF_2CFH_2$, $CF_2HCH_2CF_2H$, $CF_2HCFHCF_2H$, $CF_3CFHCF_3$, and $CF_3CH_2CF_3$, 1,2-dihydroperfluorocyclopentane and 1,1,2-trihydroperfluorocyclopentane. Useful HFCs include HFCs available under the trade designation "VERTREL" available from Chemours Co. (e.g., $CF_3CHFCHFCF_2CF_3$); those available under the "ZEORORA-H", available from Nippon Zeon Co. Ltd., Tokyo, Japan; and under the HFC designation from Allied-Signal Chemicals, Buffalo, NY.

One class of useful fluorinated fluids are hydrofluorocarbons; i.e. compounds having only carbon, hydrogen and fluorine, and optionally catenary divalent oxygen and/or trivalent nitrogen. Such compounds are nonionic, may be linear or branched, cyclic or acyclic. Such compounds are of the formula $C_nH_mF_{2n+2-m}$, where n is from about 3 to 20 inclusive, m is at least one, and where one or more non-adjacent —$CF_2$— groups may be replaced with catenary oxygen or trivalent nitrogen atoms. Preferably the number of fluorine atoms is equal to or greater than the number of hydrogen atoms, and more preferably the number of fluorine atoms is equal to or exceeds the sum of the combined number of hydrogen atoms and carbon-carbon bonds of fluorine atoms.

Exemplary HFCs include $CHF_2(CF_2)_2CF_2H$, $CF_3CF_2CH_2CH_2F$, $CF_3CH_2CF_2CH_2F$, $CH_3CHFCF_2CF_3$, $CF_3CH_2CH_2CF_3$, $CH_2FCF_2CF_2CH_2F$, $CF_3CH_2CF_2CH_3$, $CHF_2CH(CF_3)CF_3$, $CHF(CF_3)CF_2CF_3$; $CF_3CH_2CHFCF_2CF_3$, $CF_3CHFCH_2CF_2CF_3$, $CF_3CH_2CF_2CH_2CF_3$, $CF_3CHFCHFCF_2CF_3$, $CF_3CH_2CH_2CF_2CF_3$, $CH_3CHFCF_2CF_2CF_3$, $CF_3CF_2CF_2CH_2CH_3$, $CH_3CF_2CF_2CF_2CF_3$, $CF_3CH_2CHFCH_2CF_3$, $CH_2FCF_2CF_2CF_2CF_3$, $CHF_2CF_2CF_2CF_2CF_3$, $CH_3CF(CHFCHF_2)CF_3$, $CH_3CH(CF_2CF_3)CF_3$, $CHF_2CH(CHF_2)CF_2CF_3$, $CHF_2CF(CHF_2)CF_2CF_3$, $CHF_2CF_2CF(CF_3)_2$; $CHF_2(CF_2)_4CF_2H$, $(CF_3CH_2)_2CHCF_3$, $CH_3CHFCF_2CHFCHFCF_3$, $HCF_2CHFCF_2CF_2CHFCF_2H$, $H_2CFCF_2CF_2CF_2CF_2CF_2H$, $CHF_2CF_2CF_2CF_2CF_2CHF_2$, $CH_3CF(CF_2H)CHFCHFCF_3$, $CH_3CF(CF_3)CHFCHFCF_3$, $CH_3CF(CF_3)CF_2CF_2CF_3$, $CHF_2CF_2CH(CF_3)CF_2CF_3$, $CHF_2CF_2CF(CF_3)CF_2CF_3$; $CH_3CHFCH_2CF_2CHFCF_2CF_3$, $CH_3(CF_2)_5CH_3$, $CH_3CH_2(CF_2)_4CF_3$, $CF_3CH_2CH_2(CF_2)_3CF_3$, $CH_2FCF_2CHF(CF_2)_3CF_3$, $CF_3CF_2CF_2CHFCHFCF_2CF_3$, $CF_3CF_2CF_2CHFCF_2CF_2CF_3$, $CH_3CH(CF_3)CF_2CF_2CF_2CH_3$, $CH_3CF(CF_3)CH_2CFHCF_2CF_3$, $CH_3CF(CF_2CF_3)CHFCF_2CF_3$, $CH_3CH_2CH(CF_3)CF_2CF_2CF_3$, $CHF_2CF(CF_3)(CF_2)_3CH_2F$, $CH_3CF_2C(CF_3)_2CF_2CH_3CHF_2CF(CF_3)(CF_2)_3CF_3$; $CH_3CH_2CH_2CH_2CF_2CF_2CF_2CF_3$, $CH_3(CF_2)_6CH_3$, $CHF_2CF(CF_3)(CF_2)_4CHF_2$, $CHF_2CF(CF_3)(CF_2)_4CHF_2$, $CH_3CH_2CH(CF_3)CF_2CF_2CF_2CF_3$, $CH_3CF(CF_2CF_3)CHFCF_2CF_2CF_3$, $CH_3CH_2CH_2CHFC(CF_3)_2CF_3$, $CH_3C(CF_3)_2CF_2CF_2CF_2CH_3$, $CH_3CH_2CH_2CF(CF_3)CF(CF_3)_2$, $CF_3CHFCHFC_4F_9$, $CF_3CF_2CHFCHFC_3F_7$, $CF_3CHFCH_2C_4F_9$, $CF_3CH_2CHFC_4F_9$, $CF_3CF_2CH_2CHFC_3F_7$, $CF_3CF_2CHFCH_2C_3F_7$, and $CH_2FCF_2CF_2CHF(CF_2)_3CF_3$.

Other useful HFC include highly fluorinated cyclopentyl, cyclohexyl, cycloheptyl and cyclooctyl compounds having at least as many fluorine atoms as hydrogen atoms, such as $CF_3$-c-$(CF-CF_2-CH_2-CH_2-)$,

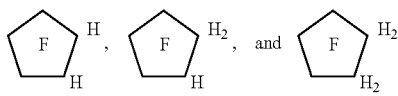

Where all of the ring carbon atoms are fluorinated (denoted by the F in the middle of the ring) except where indicated.

Preferred HFCs include $CF_3CFHCFHCF_2CF_3$, $C_5F_{11}H$, $C_6F_{13}H$, $CF_3CF_2CH_2CH_2F$, $CHF_2CF_2CF_2CHF_2$, 1,2-dihydroperfluorocyclopentane and 1,1,2trihydroperfluorocyclopentane. Commercially available HFCs include those available under the trade designation "VERTREL" available from Chemours Co., Wilmington, DE, and those available under the trade designation "ZEORORAHTM" available from Nippon Zeon Co. Ltd., Tokyo, Japan.

Generally, the most suitable fluorinated compounds will be hydrofluoroethers (HFEs), as they exhibit optimum safety (non-flammability and low toxicity) and environmental (non-ozone depleting and low global warming) properties. HFEs are chemical compounds containing carbon, fluorine, hydrogen, one or more ether oxygen atoms, and optionally one or more additional catenary heteroatoms within the carbon backbone, such as sulfur or trivalent nitrogen. The HFE can be straight-chained, branched-chained, or cyclic, or a combination thereof, such as alkylcycloaliphatic. Preferably, the HFE is free of unsaturation.

In one embodiment, the fluorinated fluid is a partially fluorinated ether or a partially fluorinated polyether. The partially fluorinated ether or polyether may be linear, cyclic or branched. In one embodiment, the partially fluorinated ether or polyether corresponds to the formula: $R^5-O-R^6$ wherein $R^5$ is a perfluorinated or partially fluorinated alkyl group that may be interrupted once or more than once by an ether oxygen and $R^6$ is a non-fluorinated or partially fluorinated alkyl group, which may be linear, branched, or cyclic. Typically, $R^5$ may have from 1 to 12 carbon atoms. $R^5$ may be a primary, secondary or tertiary fluorinated or perfluorinated alkyl residue. This means when $R^5$ is a primary alkyl residue the carbon atom linked to the ether atoms contains two fluorine atoms and is bonded to another carbon atom of the fluorinated or perfluorinated alkyl chain. In such case, $R^5$ would correspond to $R^7-CF_2-$ and the polyether can be described by the general formula: $R^7-CF_2-O-R^6$, where $R^7$ is a partially fluorinated or perfluorinated alkyl group that may be interrupted once or more than once by an ether oxygen. When $R^5$ is a secondary alkyl residue, the carbon atom linked to the ether atom is also linked to one fluorine atom and to two carbon atoms of partially and/or perfluorinated alkyl chains and $R^5$ corresponds to $(R_f^7R_f^8)CF-$. The polyether would correspond to $(R_f^7R_f^8)CF-O-R$. When $R^5$ is a tertiary alkyl residue the carbon atom linked to the ether atom is also linked to three carbon atoms of three partially and/or perfluorinated alkyl chains and $R^5$ corresponds to $(R_f^7R_f^8R_f^9)-C-$. The polyether then corresponds to $(R_f^7R_f^8R_f^9)-C-OR$, where $R_f^7$; $R_f^8$; and $R_f^9$ are independently each a partially fluorinated or perfluorinated alkyl group that may be interrupted once or more than once by an ether oxygen; and $R^6$ is a non-fluorinated or partially fluorinated alkyl group. The groups independently may be linear, branched, or cyclic. Also, a combination of polyethers may be used and also a combination of primary, secondary, and/or tertiary alkyl residues may be used.

An example of a solvent wherein $R^5$ is a partially fluorinated alkyl group includes $C_3F_7OCHFCF_3$ (CAS No. 3330-15-2). An example of a solvent wherein $R^5$ is a polyether is $C_3F_7OCF(CF_3)CF_2OCHFCF_3$ (CAS No. 3330-14-1). Exemplary HFE include: $CF_3CF(OC_2H_5)$ $CF(CF_3)_2CF_3CF(OCH_3)CF(CF_3)_2$, $C_2F_5CF(OCH_3)CF(CF_3)_2$, $C_3F_7CF(OCH_3)CF(CF_3)_2$, $C_2F_5CF(OC_2H_5)CF(CF_3)_2$, $C_4F_9OC_2F_4H$, $C_5F_{11}OC_2F_4H$, $C_6F_{13}OCF_2H$, $HC_3F_6OC_3F_6H$, $C_3F_7OCH_2F$, $HCF_2OCF_2OCF_2H$, $HCF_2OCF_2OC_2F_4OCF_2H$, $HCF_2OCF_2OCF_2OCF_2H$, $HCF_2OC_2F_4OCF_2H$, $HCF_2OCF_2CF_2OCF_2H$, $HC_3F_6OCH_3$, $HCF_2OCF_2OC_2F_4OCF_2H$, and $C_3F_7O[CF(CF_3)CF_2O]_pCF(CF_3)H$, wherein p=0 to 1. Non-segregated hydrofluoroethers specialty liquids are available from Solvay S.A. under the trade designation "GALDEN H".

In some embodiments, the partially fluorinated ether solvent is a segregated hydrofluoroether, wherein one side of the compound comprises C—F bonds, while the C—H bonds are on the other side of the compound. In one embodiment, the segregated hydrofluoroether corresponds to the formula:

$$C_pF_{2p+1}\text{—O—}C_qH_{2q+1}$$

wherein q is an integer from 1 to and 5, for example 1, 2, 3, 4 or 5, and p is an integer from 5 to 11, for example 5, 6, 7, 8, 9, 10 or 11. Preferably, $C_pF_{2p+1}$ is branched. Preferably, $C_pH_{2p+1}$ is branched and q is 1, 2 or 3.

Exemplary segregated hydrofluoroethers include:

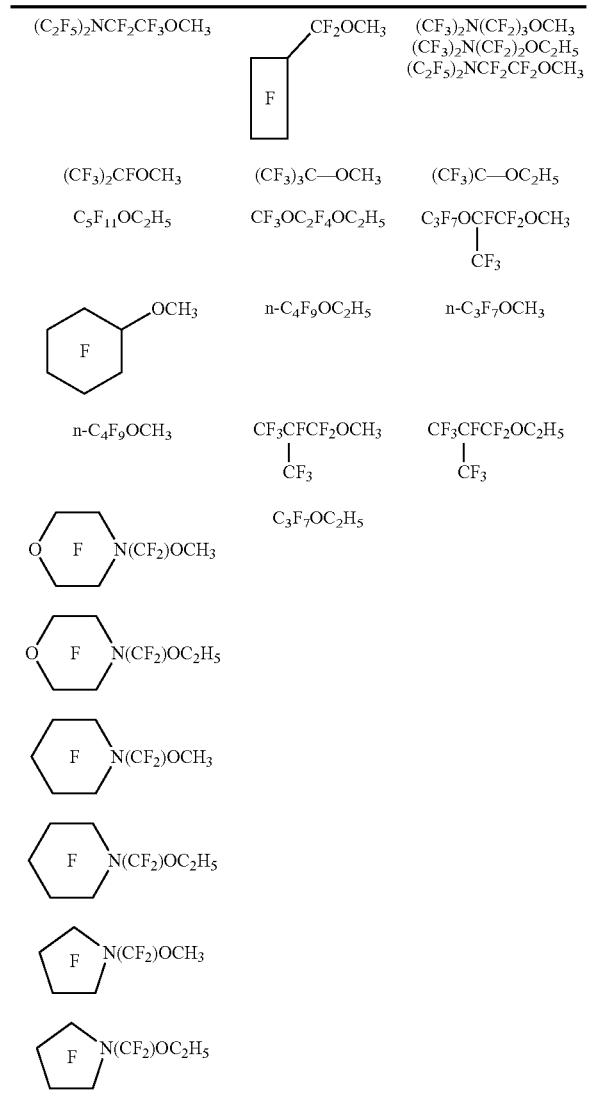

wherein cyclic structures designated with an interior "F" are perfluorinated.

Particularly preferred segregated hydrofluoroethers include n-C$_3$F$_7$OCH$_3$, (CF$_3$)$_2$CFOCH$_3$, n-C$_4$F$_9$OCH$_3$, (CF$_3$)$_2$CFCF$_2$OCH$_3$, n-C$_3$F$_7$OC$_2$H$_5$, n-C$_4$F$_9$OC$_2$H$_5$, (CF$_3$)$_2$CFCF$_2$OC$_2$H$_5$, (CF$_3$)$_3$COCH$_3$, (CF$_3$)$_3$COC$_2$H$_5$, and mixtures thereof. Segregated hydrofluoroethers are available as 3M™ NOVEC™ HFE-7100 and HFE-7200 Engineered Fluids from Minnesota Mining and Manufacturing Company, St. Paul, MN.

Representative fluorinated fluids include for example 1,1,1,2,2,3,4,5,5,5-decafluoro-3-methoxy-4-(trifluoromethyl)pentane and 3-ethoxy-1,1,1,2,3,4,4,5,5,6,6,6-dodecafluoro-2-(trifluoromethyl)hexane. Such solvents are commercially available, for example, under the trade designation "3M NOVEC ENGINEERED FLUID" such as HFE-7000, HFE-7100, HFE-7200, and HFE-7500 from 3M Company, St. Paul, MN.

Useful fluorinated fluids may also include hydrohalofluoroethers (HHFEs), which are ether compounds containing fluorine, non-fluorine halogen (i.e., chlorine, bromine, and/or iodine) and hydrogen atoms. An important subclass of HHFEs is perfluoroalkylhaloethers (PFAHEs). PFAHEs are defined as segregated ether compounds having a perfluoroalkyl group and a haloalkyl group, wherein at least one of the halogen atoms of the haloalkyl group is chlorine, bromine, or iodine. Useful PFAHEs include those described by the general structure shown in Formula V:

$$R_f\text{—O—}C_aH_bF_cX_d \qquad (V)$$

wherein $R_f$ is a perfluoroalkyl group preferably having at least about 3 carbon atoms, most preferably from 3 to 6 carbon atoms, and optionally containing a catenary heteroatom such as nitrogen or oxygen; X is a halogen atom selected from the group consisting of bromine, iodine, and chlorine; "a" preferably is from about 1 to 6; "b" is at least 1; "c" can range from 0 to about 2; "d" is at least 1; and b+c+d is equal to 2a+1. Such PFAHEs are described in PCT Publication No. WO 99/14175. Useful PFAHEs include c-C$_6$F$_{11}$—OCH$_2$Cl, (CF$_3$)$_2$CFOCHCl$_2$, (CF$_3$)$_2$CFOCH$_2$Cl, CF$_3$CF$_2$CF$_2$OCH$_2$Cl, CF$_3$CF$_2$CF$_2$OCHCl$_2$, (CF$_3$)$_2$CFCF$_2$OCHCl$_2$, (CF$_3$)$_2$CFCF$_2$OCH$_2$Cl, CF$_3$CF$_2$CF$_2$CF$_2$OCHCl$_2$, CF$_3$CF$_2$CF$_2$CF$_2$OCH$_2$Cl, (CF$_3$)$_2$CFCF$_2$OCHClCH$_3$, CF$_3$CF$_2$CF$_2$CF$_2$OCHClCH$_3$, (CF$_3$)$_2$CFCF(C$_2$F$_5$)OCH$_2$Cl, (CF$_3$)$_2$CFCF$_2$OCH$_2$Br, and CF$_3$CF$_2$CF$_2$OCH$_2$I.

In another embodiment, the fluorinated fluid is a perfluorinated aminoolefin of the general formula (VI)

$$CFY\text{=}CXN(Rf)CF_2Rf' \qquad (VI)$$

where:
Rf and Rf' are (i) independently selected from a linear or branched perfluoroalkyl group having 1-8 carbon atoms, optionally comprising at least one catenated O or N atom, or (ii) bonded together to form a perfluorinated ring structure having 4-8 ring carbon atoms, optionally comprising at least one ether linkage; and
X and Y are (i) independently selected from a perfluoroalkyl group having 1-4 carbon atoms, or (ii) bonded together to form a perfluorinated ring structure having 5-6 ring carbon atoms. Such compounds are disclosed in WO 2019/220293 (Smith et al.), herein incorporated by reference.

The fluorinated dye molecules disclosure herein should be soluble in the selected fluorinated fluid, such compositions may then be used to generate testing fluids, which can be used to visually monitor leaks.

First, the fluorinated dye molecules and the fluorinated fluid are mixed, in ratios of amounts of from about 0.0001 to about 0.1 grams of fluorinated dye molecules for every about 100 grams of fluorinated fluid. Generally, the amount required for each different type of fluorinated dye molecules will differ due to the different possible structures. Some of the fluorinated dye molecules may require as little as 0.0001 grams per 100 grams of fluorinated fluid to provide effective leak detection; others may require more. Second, the fluorinated dye molecule/fluorinated fluid solution is introduced within the given system (such as a refrigeration system or air conditioning system) comprising the fluorinated fluid. The system is then operated a sufficient time for proper mixing of the fluorinated dye molecule/fluorinated fluid solution within desired system. Finally, the presence of a leak in the system can be determined by directing an ultraviolet light at the system and subsequently detecting a fluorescing color through for example, observation of the lighted area. If a leak exists, the fluorinated dye molecule should fluoresce under such an ultraviolet light source (for example 365 nm in wavelength).

Because the fluorinated dye molecules of the present invention are miscible with fluorinated fluids, concentrated solutions can be produced within the fluorinated fluid which thus serves, as a solvent or carrier for the fluorinated dye molecule. Beneficially, then, only a small amount of the fluorinated dye molecule is needed to effectively provide sufficient leak detection agents within the desired system (e.g., air conditioning system or refrigeration system). This translates into lower cost for the consumer since lower amounts of relatively expensive leak detection colorant would be necessary. Alternatively, since the fluorinated dye molecule is a liquid, it can easily be added in a neat state, without the need for a solvent or carrier. Again, this alternative further reduces the necessary amount of the leak detection formulation added to the system.

Because the fluorinated dye molecule is not visible by the unaided human eye in visible light conditions, there may be no need to change fluids after the leak has been repaired, and the dye can coexist with system fluids without adversely affecting the system parts. As the dye is not removed from the system, the test may be repeated to ensure that the leak has been successfully repaired and that no additional leaks exist.

In one embodiment, a method for detecting leakage in a desired system (such as a refrigeration system) comprises circulating a composition comprising the fluorinated dye molecule and a fluorinated fluid as described above through the system and thereafter subjecting the system to an ultraviolet light to fluoresce any dye which escapes therefrom through a leak to thereby locate the leak such that the leak can be repaired. If the leak is sufficiently large, streams of fluorescent dyed refrigerant may be seen emanating from the leak source.

In performing the method, the desired system is operated for a period of time to thoroughly mix the fluorescent dye within the system fluid. The system is then subjected to an ultraviolet light to fluoresce any dye which escapes therefrom through a leak. Visual inspection under the ultraviolet light will locate the leak. After the leak is repaired, excess fluid and dye may be removed from the surface area with a solvent. The system is then operated again to insure that the leak has been successfully repaired, and that no additional leaks exist.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods.

The following abbreviations are used in this section: g=gram, mg=milligrams, mmol=millimole, min=minutes, h=hours, ° C.=degrees Celsius, g/mol=grams/mole, FT-IR=Fourier Transform infrared spectrometry, wt %=weight percent, mL=milliLiters, nm=nanometer, and MHz=megaHertz.

TABLE 1

Materials List

| DESIGNATION | DESCRIPTION |
| --- | --- |
| HFPO methyl ester | Obtained from 3M Company, Maplewood, MN |
| 5-aminopentanol | Obtained from Sigma-Aldrich Chemical Company, St. Louis, MO |
| PF5052 | Perfluorinated liquid, available under the trade designation "3M PERFORMANCE FLUID PF-5052" from 3M Company, Maplewood, MN |
| IPA | Isopropanol, obtained from VWR International, LLC. Radnor, PA |
| HFE 7200 | ethoxy-nonafluorobutane, available under the trade designation "3M NOVEC 7200 ENGINEERED FLUID" from 3M Company |
| $NEt_3$ | Triethyl amine, obtained from EMD Millipore Corporation. Billerica, MA |
| methanesulfonyl chloride | Obtained from Alfa Aesar, Ward Hill, MA |
| Celite 545 | Diatomaceous earth, available under the trade designation "CELITE 545" from EMD Millipore Corporation, Billerica, MA |
| THF | Tetrahydrofuran, obtained from EMD Millipore Corporation. Billerica, MA |
| $NaHCO_3$ | Sodium Bicarbonate, obtained from Avantor Performance Materials, Center Valley, PA |
| $Na_2SO_4$ | Sodium sulfate, Obtained from Alfa Aesar |
| 7-hydroxy-4-methylcoumarin | Obtained from Alfa Aesar |
| MEK | Methyl ethyl ketone, obtained from EMD Millipore Corporation |

TABLE 1-continued

Materials List

| DESIGNATION | DESCRIPTION |
| --- | --- |
| DBU | 1,8-Diazabicyclo[5.4.0]undec-7-ene, obtained from Sigma-Aldrich Chemical Company, St. Louis, MO |
| 4-hydroxychromen-2-one | Obtained from Oakwood Chemical, Estill, SC |
| $C_4F_9SO_2NH(Me)$ | Obtained from 3M Company |
| 5-chloro-1-pentanol | Obtained from Alfa Aesar |
| MeCN | Acetonitrile, obtained from EMD Millipore Corporation |
| KOH | Obtained from EMD Millipore Corporation |
| FC-70 | Perfluorotripentylamine available under the trade designation "3M FLUORINERT ELECTRONIC LIQUID FC-70" from 3M Company |

Test Methods

Solubility Test Method

For compounds 4 and 5, a known amount of material was weighed into a scintillation vial and 1 mL of each solvent was volumetrically added followed by sonication for dissolution. For samples that completely dissolved, the formed solution was then added to additional aliquots of sample in an attempt to generate a saturated solution. However, this either led to gels from which soluble fractions could not be obtained or did not result in saturation. In the case of compound 8, approximately 100 mg was suspended in 10 mL of each solvent and shaken for 1-2 h, after which the solution was filtered via syringe filter into a tared vial and the solution mass measured. The solvent was evaporated in vacuo and the mass of the remaining residue was recorded.

NMR ($^1H$ and $^{19}F$) Test Method

Samples were dissolved in $CDCl_3$, unless noted otherwise, and a Fourier Transform Nuclear Magnetic Resonance (FT NMR) spectrometer (Bruckerm Bukkerucam MA) was used to acquire $^1H$ NMR (500 MHz) and $^{19}F$ NMR (500 MHz) spectra.

GC/MS Test Method

The samples were analyzed by Gas Chromatography-Flame Ionization Detector (GC-FID)/Gas Chromatography-Mass Spectrometer (GC-MS) on a Thermo Scientific TSQ Quantum XLS using Positive Chemical Ionization (Waltham, MA).

UV/Vis Test Method

Unless otherwise mentioned, the sample was diluted into HFE 7200 and spectra were collected on an Ultraviolet-Visible (UV/Vis) spectrometer (available under the trade designation "CARY 8454" from Agilent Technologies, Inc, Santa Clara, CA) using 1 cm quartz cuvettes.

Fluorescence Test Method

Unless otherwise mentioned, the sample was diluted into HFE 7200 and spectra were collected on a fluorimeter (available under the trade designation "FLUOROLOG 3-21 HR" from Jobin-Yvon Horiba, Inc., Edison, NJ) in a 1 cm fluorescence cuvette under the following experimental parameters:

Orientation: 10 degree (front face)
    EX Slit Width: 1.0 nm
    EM Slit Width: 1.0 nm
    EX Data Interval: 5 nm
    EM Data Interval: 5 nm
    EX Wavelength range: 300 nm to 500 nm
    EM Wavelength range: 400 nm to 650 nm Preparation of HFPO Alcohol Molecule 2

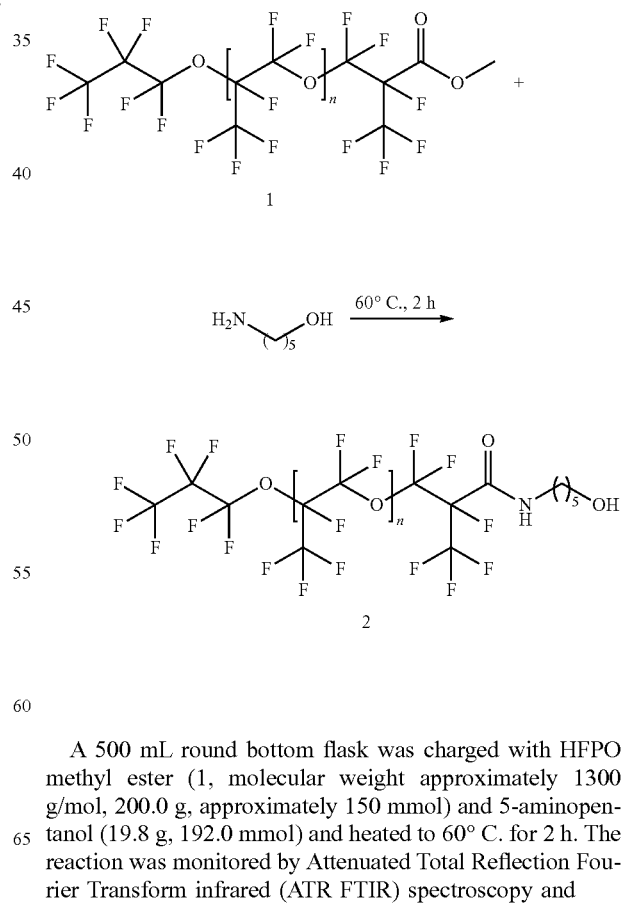

A 500 mL round bottom flask was charged with HFPO methyl ester (1, molecular weight approximately 1300 g/mol, 200.0 g, approximately 150 mmol) and 5-aminopentanol (19.8 g, 192.0 mmol) and heated to 60° C. for 2 h. The reaction was monitored by Attenuated Total Reflection Fourier Transform infrared (ATR FTIR) spectroscopy and stopped once the ester peak disappeared. The reaction was then diluted with 100 mL PF5052 and washed three times with 200 mL 3:1 IPA:H$_2$O. The fluorinated layer was then removed under vacuum and N$_2$ was bubbled through the clear colorless oil to eliminate excess solvent and gave 199 g of the final product 2. $^1$H NMR taken in (CD$_3$)$_2$CO was consistent with the desired compound.

Preparation of HFPO Mesylate (Molecule 3)

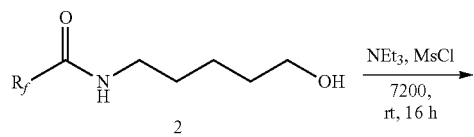

anesulfonyl chloride (1.1 g, 0.77 mL, 9.9 mmol) was added drop wise over approximately 15 min. The reaction was then allowed to stir at room temperature for 16 h. The solution was then filtered through a pad of Celite 545, the Celite 545 was washed with 14 mL of HFE 7200, and the filtrate was then diluted with approximately 30 mL THF, which was then washed with 50 mL of a sat. aqueous NaHCO$_3$ solution. The layers were separated and the fluorinated layer was dried over Na$_2$SO$_4$, filtered, and concentrated under reduced pressure to give mesylate 3 as a milky syrup (6.9 g, molecular weight approximately 1480 g/mol, 99% yield) that was used without further purification. $^1$H NMR taken in (CD$_3$)$_2$CO was consistent with the desired compound.

Example 1: Preparation of Molecule 4

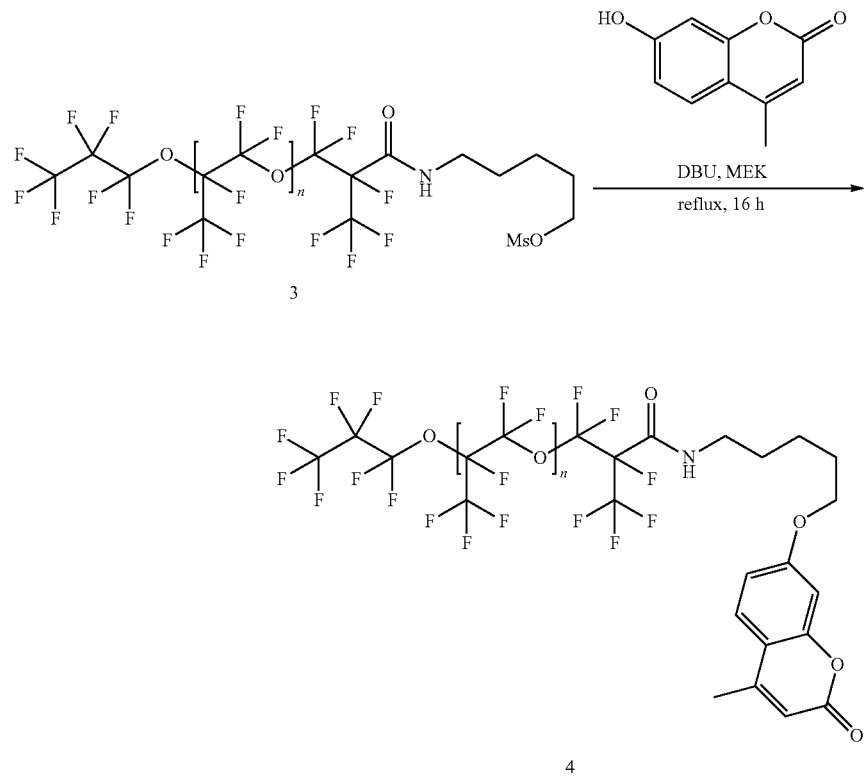

-continued

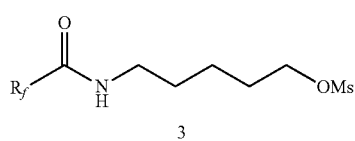

A 50 mL round bottom flask was charged with HFPO alcohol from above (Molecule 2, molecular weight approximately 1400 g/mol, 6.6 g, 4.7 mmol), HFE 7200 (14 mL), and NEt$_3$ (0.94 g, 1.3 ml, 9.3 mmol). While stirring meth- A 250 mL round bottom flask was charged with HFPO mesylate from above (3, 6.9 g, molecular weight approximately 1480 g/mol, 4.6 mmol) and MEK (25 mL), the 7-hydroxy-4-methylcoumarin (0.9 g, 5.1 mmol) was added to give a insoluble mixture, DBU (1.0 g, 0.99 mL, 6.6 mmol) was added and the dye immediately solubilized and the reactions turned a clear yellow color. The reaction was then heated to reflux (approximately 80° C.) overnight. The reaction was then allowed to cool to room temperature and was diluted with 50 mL of PF5052 and 50 mL of 3:1 H$_2$O:IPA, the layers were mixed and then allowed to phase split (this may take 10 to 15 min. as the milky emulsion formed takes time to separate), the lower fluorochemical layer was filtered through a pad of Celite 545, dried over Na$_2$SO$_4$, and concentrated to give molecule 4 as a clear golden yellow syrup (6.3 g, molecular weight approximately 1680, 80% yield) that was used without further purification. $^1$H NMR data was consistent with the desired compound. The $\lambda_{max}$ from the UV/Vis test was 320 nm. Results from the fluorescence test were excitation $\lambda$=320 nm and emission $\lambda_{max}$=380 nm.

Example 2: Synthesis of Molecule 5

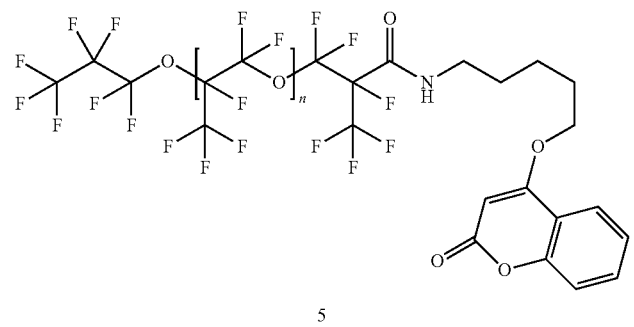

A 250 mL round bottom flask was charged with HFPO mesylate from above (3, 7.6 g, molecular weight approximately 1480 g/mol, 5.1 mmol) and MEK (50 mL), the 4-hydroxychromen-2-one (1.7 g, 10 mmol) was added to give a insoluble mixture, DBU (1.7 g, 1.7 mL, 11 mmol) was added and the dye immediately solubilized and the reactions turned a clear yellow color. The reaction was then heated to reflux (approximately 80° C.) overnight. The reaction was then allowed to cool to room temperature and was diluted with 100 mL of PF5052 and 100 mL of 3:1 H$_2$O:IPA, the layers were mixed and then allowed to phase split (this may take 10 to 15 min. as the milky emulsion formed takes time to separate), the lower fluorochemical layer was filtered through a pad of Celite 545, dried over Na$_2$SO$_4$, and concentrated and placed under high vacuum (1.9 Torr) to give molecule 5 as a clear golden yellow syrup (7.4 g, molecular weight of approximately 1680 g/mol, 93% yield) that was used without further purification. $^1$H NMR data was consistent with the desired compound. The $\lambda_{max}$ from the UV/Vis test was 260 and 300 nm. Results from the fluorescence test were excitation $\lambda$=300 nm and emission $\lambda_{max}$=370 nm.

Preparation of Molecule 6

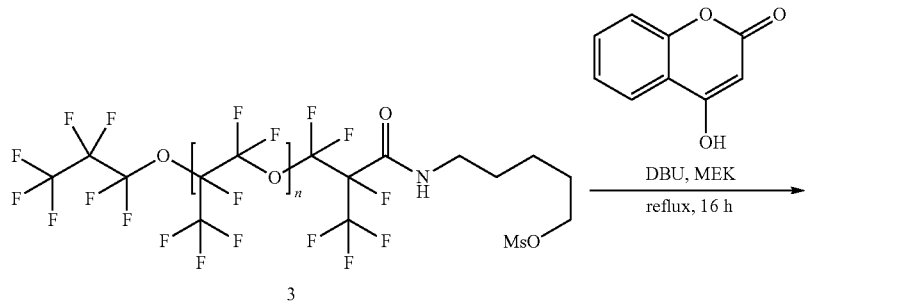

-continued

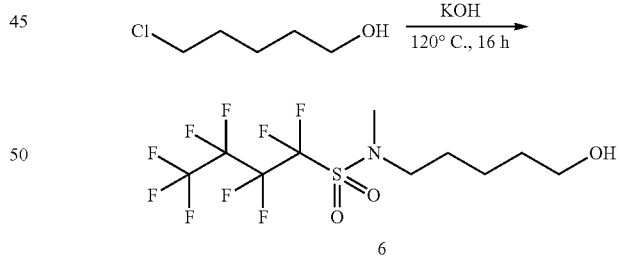

A 1 L round bottom flask was charged with C$_4$F$_9$SO$_2$NH(Me) (123 g, 0.394 mol) and 5-chloro-1-pentanol (28.8 g, 0.407 mol) and heated to 120° C. A KOH solution (26.9 g, 0.408 mmol dissolved in 27 g H$_2$O) was added slowly with the water being stripped to a Dean-Stark trap. The reaction heated overnight at 120° C. The batch was cooled to 100° C. and 150 mL of H$_2$O was added. The batch was stirred for 15 min and then the phases split, to give 154 g of the lower phase. The lower phase was distilled through a 6 plate sieve tray column at 2 mm at 141-155° C. to give 63.5 g. Product was confirmed by GC/MS.

Preparation of Molecule 7

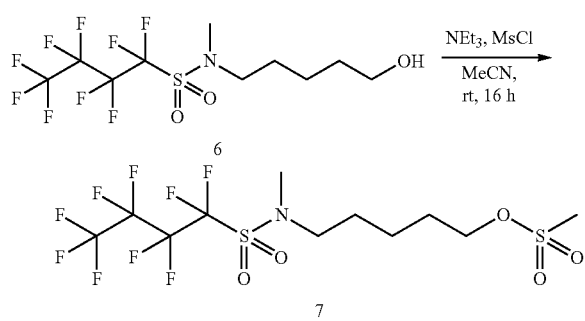

A 100 mL round bottom flask was charged with alcohol (molecule 6, 5.00 g, 12.5 mmol), MeCN (30 mL), and NEt$_3$ (1.8 g, 2.5 ml, 18 mmol). While stirring methanesulfonyl chloride (2.00 g, 1.35 mL, 17.5 mmol) was added drop wise over approximately 15 min. The reaction was then allowed to stir at room temperature for 16 h. The reaction was then quenched with 25 mL of H$_2$O and diluted with 50 mL ethyl acetate which was then washed with 50 mL of a sat. aqueous NaHCO$_3$ soln. The layers were separated, and the organic layer was dried over Na$_2$SO$_4$, filtered, and concentrated under reduced pressure to give mesylate 7 as a clear oil (6.00 g, 12.5 mmol, 100% yield) that was used without further purification. $^1$H and $^{19}$F NMR data was consistent with the desired compound.

Comparative Example A: Synthesis of Molecule 8

150 mL ethyl acetate. the organic layer was washed once with a NaHCO$_3$ saturated solution, dried over Na$_2$SO$_4$, filtered and concentrated to give an amber syrup. the material was purified by column chromatography a gradient of 75:25 heptane:ethyl acetate to 45:55 heptane:ethyl acetate. (thin layer chromatography conditions: visualization: long wave UV 365 nm; eluent: 50:50 heptane:ethyl acetate, R$_f$: starting material: 0.32, product: 0.53; eluent: 75:25 heptane: ethyl acetate, R$_f$: starting material: 0.10, product: 0.19) this gave 8 as a white waxy solid (4.1 g, 7.4 mmol, 65% yield). $^1$H and $^{19}$F NMR data was consistent with the desired compound. The λ$_{max}$ from the UV/Vis test was 320 nm. Fluorescence was conducted in CHCl$_3$ instead of HFE 7200, the excitation λ=320 nm and emission λ$_{max}$=380 nm.

The solubility of the various molecules are shown in Table 2 below.

TABLE 2

| Molecule | Sample Mass | Solvent | Solubility (g/mL) | wt % of solution |
|---|---|---|---|---|
| 4 | 1.5169 | HFE 7200 (1 mL) | >1.5169 | 51 |
| 4 | 1.7339 | PF-5052 (1 mL) | >1.7339 | 50 |
| 4 | 1.3691 | FC-70 (1 mL) | >1.3691 | 41 |
| 5 | 0.9782 | HFE 7200 (1 mL) | >0.9782 | 41 |
| 5 | 0.5398 | PF-5052 (1 mL) | gel | — |
| 5 | 0.6105 | FC-70 (1 mL) | gel | — |
| 8 | 0.0157 | HFE 7200 (10 mL) | 0.00157 | 0.1 |
| 8 | 0.0407 | PF-5052 (10 mL) | 0.00407 | 0.2 |
| 8 | None recovered | FC-70 (10 mL) | Insoluble | 0 |

As shown in Table 2, Molecule 5 (Example 2) formed a gel in PF-5052 and FC-70 at the given amount. These samples were repeated using less mass of Molecule 5. Example 2 was able to form a solution in both PF-5052

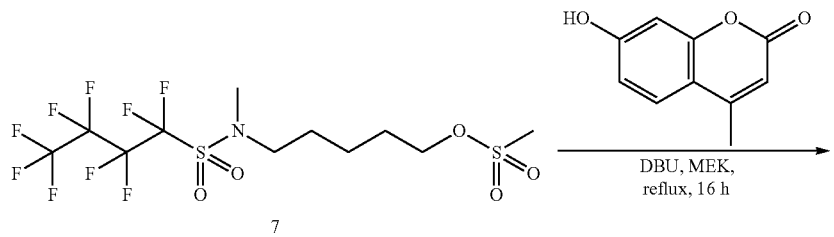

A 250 mL round bottom flask was charged with mesylate (7, 6.9 g, 13 mmol) and MEK (22 mL), the 7-hydroxy-4-methylcoumarin (2.0 g, 11 mmol) was added to give a insoluble mixture, DBU (1.9 g, 1.9 mL, 12 mmol) was added and the dye immediately solubilized and the reactions turned a clear yellow color. The reaction was then heated to reflux (approximately 80° C.) overnight. The reaction was then cooled to room temperature, diluted with 50 mL H$_2$O and (concentration of approximately 2 wt % of Molecule 5 in PF-5052) and FC-70. It is believed that some molecules may have a tendency to gel at high concentrations (e.g., the molecule comprises more than 50 wt % of the composition).

10 mg of each of the compounds described in Table 3 was added into a vial with 4.990 g of the fluorinated fluid as described in Table 3 and mixed to yield a 0.2 wt % solution. The resulting solution was viewed with an unaided human eye, and then the solution was exposed to ultraviolet radiation (365 nm) and observed for fluorescence. The results are shown in Table 3 below.

TABLE 3

| Compound | Fluorinated Fluid | Resulting solution | Solution after exposure to 365 nm radiation |
|---|---|---|---|
| 4 | PF5052, HFE 7200 FC-70 | Clear, Colorless | Blue, clear solution |
| 5 | PF5052, HFE 7200 FC-70 | Clear, Colorless | Blue, clear solution |
| 8 | PF5052, HFE 7200 FC-70 | Colorless solution with white solid | Colorless solution with white solid |

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A fluorinated dye comprising:
   a fluorescing coumarin-derived moiety connected to an oligomer of hexafluoropropylene oxide via a non-fluorinated divalent linking group, wherein the fluorinated dye is

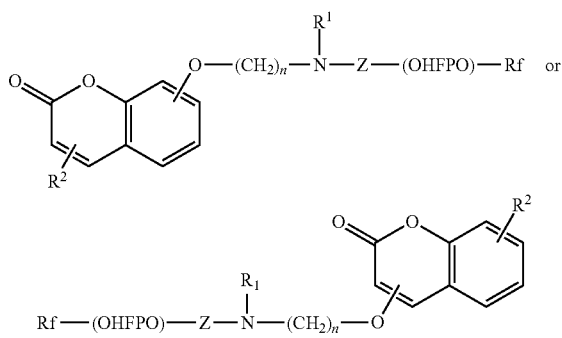

where $R^1$ is H or methyl; Z is a —C(=O)— or —S(=O)$_2$—; Rf is a perfluorinated alkyl group comprising 1 to 20 carbon atoms and optionally comprising at least one catenated in-chain oxygen atom; n is greater than 2; $R^2$ is H or methyl, and OHFPO is an oligomer of hexafluoropropylene oxide connected together via ring opening of the oligomerization.

2. The fluorinated dye according to claim 1, wherein the oligomer comprises at least 2 interpolymerized hexafluoropropylene oxide units.

3. The fluorinated dye according to claim 1, wherein the fluorinated dye does not sufficiently absorb visible electromagnetic radiation.

4. The fluorinated dye according to claim 1, wherein the fluorinated dye absorbs ultraviolet electromagnetic radiation.

5. A testing composition comprising the fluorinated dye according to claim 1 and fluorinated fluid.

6. The testing composition according to claim 5, wherein the fluorinated fluid comprises a perfluorocarbon, a perfluoropolyether, a hydrochlorofluorocarbon, a hydrofluoroether, a hydrofluorocarbon, a hydrohalofluoroether, a hydrofluoroolefins, or mixtures thereof.

7. The testing composition according to claim 5, wherein the fluorinated dye has a solubility in the fluorinated fluid of at least 0.1% by weight.

8. The testing composition according to claim 5, wherein the fluorinated dye has a solubility in the fluorinated fluid of at least 1.0% by weight.

9. The testing composition according to claim 5, wherein the fluorinated dye is miscible with the fluorinated fluid.

10. The testing composition according to claim 5, wherein the fluorinated fluids comprise at least one of a hydrofluoroether or a perfluorinated cyclic amine.

11. A method of using the fluorinated dye according to claim 1 as a leak detector.

12. A method for detecting leaks in a refrigeration system comprising (a) introducing a fluorinated dye comprising a fluorescing coumarin-derived moiety connected to an oligomer of hexafluoropropylene oxide via a non-fluorinated divalent linking group according to claim 1, within a refrigeration system comprising a refrigerant composition comprising a fluorinated fluid, (b) operating the refrigeration system for a sufficient time to allow for thorough mixing of the fluorinated dye and the refrigerant composition; and (c) determining the presence of a leak in the refrigeration system by directing an ultraviolet light at the refrigeration system and subsequently detecting a fluorescing color.

* * * * *